United States Patent Office 3,416,501
Patented Dec. 17, 1968

3,416,501
INTERNAL-COMBUSTION ENGINES
Gaetan de Coye de Castelet, Billancourt, France, assignor to Regie Nationale des Usines Renault, Billancourt, France
Filed Oct. 31, 1966, Ser. No. 590,696
Claims priority, application France, Jan. 13, 1966, 45,812
1 Claim. (Cl. 123—30)

ABSTRACT OF THE DISCLOSURE

In an internal combustion engine, the inclined seats of the inlet and exhaust valves are arranged in such a manner that their upper edges practically touch. A central spark plug is placed in a recessed cavity communicating with the combustion chamber via two inclined channels. The gas inlet conduit terminates in the form of a volute to impart a gyrating movement to the gases which will rotate around the axis of the cylinder. The head of the piston has a conical frustum shape with a slightly hollowed small base which fits the shape of the combustion chamber.

---

Figure 1:
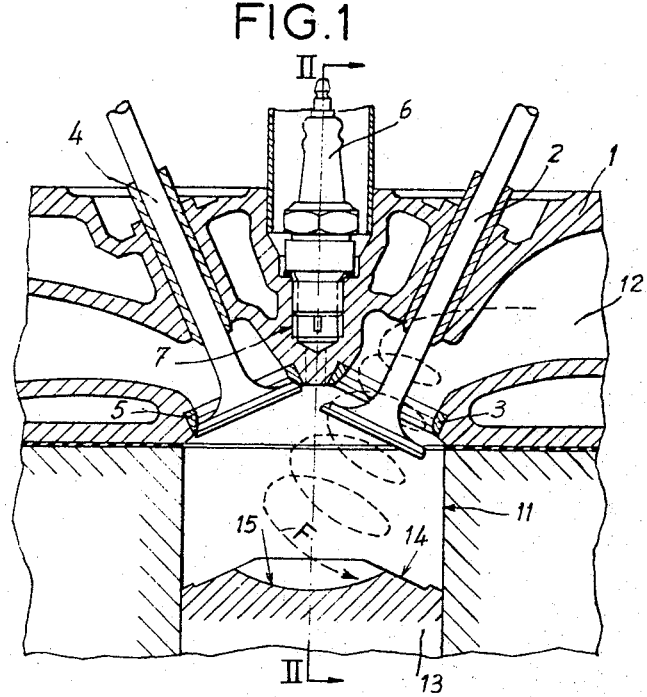

This invention relates to improvements relating to internal-combustion engines of the type described and illustrated in the patent No. 3,144,103, issued Aug. 11, 1964, to Lucien Peras which consist in mounting, in a semi-spherical combustion chamber, inlet and exhaust valves having a maximum diameter, the upper portions of the valve seats nearly contacting each other, the central spark plug being disposed above and considerably away from these valve seats in a recess communicating with the combustion chamber by means of a pair of inclined passages.

These improvements permit improving considerably the power output of engines having a small or moderate cubic capacity.

The object of the present invention is the further improve the results so far obtained with this engine disposal by associating with the arrangement disclosed in the said patent the advantageous effects of a suitably arranged turbulence of the induction gaseous mixture as well as the concentration of this mixture in the bottom of the combustion chamber by combining the semispherical configuration of this chamber with the shape of the piston crown.

The turbulence of the induction gaseous mixture is obtained by using means known per se such as an induction pipe of which the shape and direction are such that the gas directed during its flow by the wall of said pipe is caused to impinge against the inlet valve after having compusorily received the motion capable of imparting thereto the desired turbulence, that is, a motion approximating a rotation about the cylinder axis.

Figure 2:
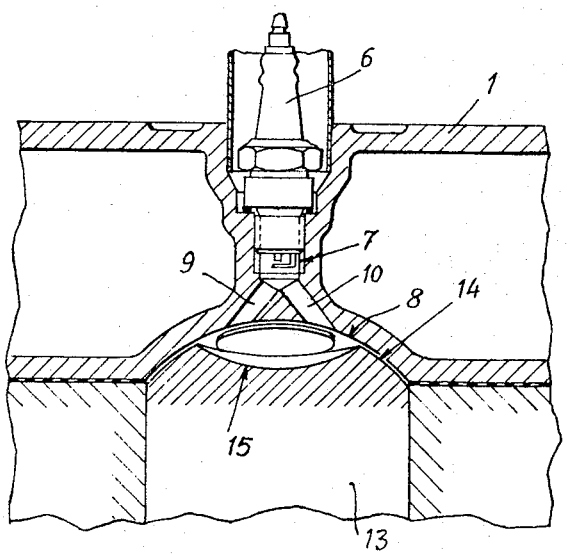

In order to afford a clearer understanding of this invention and of the manner in which the same may be carried out in practice, reference will now be made to the accompanying drawing in which a typical form of embodiment of the invention is shown diagrammatically by way of example. In the drawing:

FIGURE 1 is a framentary cross-sectional view showing the upper portion of the cylinder of an internal-combustion engine constructed according to the teachings of this invention, and FIGURE 2 is a section taken upon the line II—II of FIGURE 1.

In the drawing, the reference numeral 1 designates the cylinder head of the engine, 2 being the inlet valve associated with a valve seat 3, and 4 is the exhaust valve associated with a seat 5, the spark plug 6 is somewhat spaced above the valve seats and mounted in a recessed cavity 7 communicating through a pair of inclined passages 9 and 10 with the semispherical combustion chamber 8.

This assembly is so far in conformity with the said patent arrangement.

The improvements consituting the subject-matter of the present invention consist in imparting to the induction gaseous mixture introduced into the cylinder 11 a circular motion as shown by the arrow F in FIGURE 1.

To this end, and as already known per se, the induction pipe 12 as a scroll-shaped end portion leading to the seat 3 of the linet valve.

The improvements according to the present invention further consist, as also already known per se, in giving to the crown of piston 13 a frusto-conical configuration, the lateral portion 14 of this crown corresponding as much as possible to the shape of the combustion chamber, its minor base 15 slightly hollow, as shown in the figures, so that when the piston is in its top dead center position (FIGURE 2) the gaseous mixture is concentrated in the bottom of the combustion chamber (compression storke).

This concentration effect exerted on the carbureted mixture charge accelerates at the same time the gyratory motion imparted to the gaseous mixture.

Since the motion imparted to this gaseous mixture is a general gyratory motion instead of a simple random turbulence, a flame front, that is, a well-defined boundary between the fresh gases and the burnt gases can be obtained and caused to advance regularly up to complete combustion of the mixture.

This complete combustion is ascribable on the other hand to the regular configuration of the combustion chamber and the intense gyratory motion developed therein, so that any zone in which gases might accumulate and develop the so-called detonation effect is safely avoided. This permits attaining compression-ratio values definitely higher than those contemplated heretofore in internal combustion engines without producing any detonation, and is therefore attended by a substantial increment in the engine power output.

I claim:

1. In an internal combustion engine, at least one cylinder having a hemispherical combustion chamber, a pair of inclined valves whose upper seat portions debouch into said chamber closely adjacent each other, a recessed central cavity the axis of which coincides with that of the cylinder, a spark plug mounted in said cavity, two inclined conduits extending from said cavity to the periphery of the combustion chamber to establish communication therebetween, an inlet conduit terminating at the associated valve in a form which imparts to the combustion gases a gyrating movement rotating substantially about the axis of the cylinder, and a piston movably mounted in the cylinder and having a frustoconical head closely fitting the shape of the combustion chamber, a hollow portion formed in the small base of said head, said hollow portion at the end of the stroke of said piston combining with the hemispherical chamber to cause a concentration of gases accelerating their gyrating movement.

References Cited

UNITED STATES PATENTS

| 2,766,738 | 10/1956 | Hoffmann | 123—32 |
| 2,840,059 | 6/1958 | Buchi | 123—32 |
| 2,858,812 | 11/1958 | Hoffmann | 123—32 |
| 3,125,080 | 3/1964 | Hoffmann | 123—32 |

LAURENCE M. GOODRIDGE, *Primary Examiner.*

U.S. Cl. X.R.
123—32, 143, 148